US008673378B2

(12) United States Patent
Hirzel

(10) Patent No.: US 8,673,378 B2
(45) Date of Patent: Mar. 18, 2014

(54) TOMATO PEELING PROCESS

(75) Inventor: William J. Hirzel, Walbridge, OH (US)

(73) Assignee: Hirzel Canning Company, Northwood, OH (US)

( * ) Notice: Subject to any disclaimer, the term of this patent is extended or adjusted under 35 U.S.C. 154(b) by 130 days.

(21) Appl. No.: 13/383,226

(22) PCT Filed: Jul. 12, 2010

(86) PCT No.: PCT/US2010/041667
§ 371 (c)(1),
(2), (4) Date: Jan. 10, 2012

(87) PCT Pub. No.: WO2011/008676
PCT Pub. Date: Jan. 20, 2011

(65) Prior Publication Data
US 2012/0107462 A1    May 3, 2012

Related U.S. Application Data

(60) Provisional application No. 61/225,361, filed on Jul. 14, 2009.

(51) Int. Cl.
*A23L 1/212* (2006.01)
(52) U.S. Cl.
USPC ............................... 426/287; 426/482

(58) Field of Classification Search
USPC .................................. 426/615, 287, 481–483
See application file for complete search history.

(56) References Cited

U.S. PATENT DOCUMENTS

| | | |
|---|---|---|
| 2,847,334 A | 8/1958 | Kilburn et al. |
| 3,307,601 A | 3/1967 | Aepli |
| 4,260,638 A | 4/1981 | Schultz et al. |
| 4,528,106 A | 7/1985 | Grolitzer |
| 4,562,772 A | 1/1986 | Battistini |
| 5,732,615 A | 3/1998 | Harvey et al. |
| 5,843,507 A | 12/1998 | Harvey et al. |
| 5,912,038 A | 6/1999 | Gruenwald |
| 6,007,855 A | 12/1999 | Creed et al. |
| 6,155,163 A | 12/2000 | Creed et al. |
| 6,419,967 B1 | 7/2002 | Creed et al. |
| 2004/0163142 A1 | 8/2004 | Bovy et al. |

*Primary Examiner* — Carolyn Paden
(74) *Attorney, Agent, or Firm* — Fraser Clemens Martin & Miller LLC; Michael E. Dockins

(57) ABSTRACT

A method for peeling tomatoes is disclosed, the method comprises the steps of providing a tomato having a peel and an underlying fruit; washing the tomato with a solution to break down naringenin chalcone in the peel; treating the tomato peel with a caustic solution including OH" molecules to separate the peel from the fruit; introducing pH adjusted water to the OH"-treated tomato; and peeling the tomato to remove the peel from the underlying fruit.

19 Claims, No Drawings

TOMATO PEELING PROCESS

CROSS-REFERENCE TO RELATED APPLICATION

This application claims the benefit of priority of U.S. Provisional Patent Application Ser. No. 61/225,361 filed on Jul. 14, 2009.

FIELD OF THE INVENTION

The present invention relates to a method for peeling agricultural produce, and more specifically to an improved method for peeling tomatoes. However, the method may be applied to peeling other fruits and vegetables, as well, especially fruits and vegetables having peel structures similar to the peel of tomatoes.

BACKGROUND OF THE INVENTION

Current tomato peeling methods are of two general types: steam peeling and lye peeling.

In a current steam peeling process, tomatoes are subjected to pressurized steam to loosen the tomato peel. The advantage of a steam peeling process is that virtually all of the by-products of the process are edible and useable in the production of catsup and other consumables. Indeed, when the total output of the steam peeling process is assessed, including both whole tomatoes and by-products, fully 95% or more of the tomato input is recoverable. However, product throughput for any given commercially-available apparatus is generally limited to an established number of tons per hour, above which, peeling efficiency is minimized. For example, in a Food Machinery Corporation (FMC) Model SP-20 Tomato Steam Peeler, the generally-recognized upper limit of continuous throughput for an unmodified apparatus is approximately 23 to 24 tons per hour in peeling the "Brigade" tomato, a common tomato variety.

Further, the FMC SP-20 peels the Brigade tomato variety most efficiently at a temperature of approximately 300° F., and at a steam pressure of about 25 psi. However, it is expensive to generate high temperatures and steam pressures, and high temperatures and pressures degrade product quality (i.e. peel and fruit consistency and color, loss of nutritional constituents of the tomato) and reduce the number of whole tomatoes that may be recovered.

In a current lye peeling process, tomatoes are immersed in a solution of 15-20% lye at a temperature of about 180-200° F. for about 15-30 seconds. The lye-treated tomatoes are held for less than 3 minutes and the peel is slipped off of the underlying fruit. After the peel is removed, the whole tomato is washed, inspected, and used for canned or aseptic bulk tomato products. Using a lye peeling process, the whole-tomato product recovery is typically between 70% and 80% or less. However, lye is expensive and dangerous, and the reactivity of the lye limits the useful life of processing equipment. By-products of the lye peeling process are discarded as unusable and inedible waste, the tomato peel and other tomato by-products are also discarded, and valuable nutrients in the peel and byproduct such as carotenoids like lycopene and beta-carotene are lost.

Thus, it would be advantageous to peel tomatoes at lower temperatures while minimizing wasted by-product and maximizing product quality.

SUMMARY OF THE INVENTION

Concordant and congruous with the present invention, a method of peeling tomatoes at lower temperatures and pressures without a significant loss of throughput, product quality, and whole-tomato product recovery has been surprisingly discovered.

In an embodiment of the invention, a method for removing a peel from a tomato, comprises the steps of providing a tomato having a peel and an underlying fruit; washing the tomato with a solution to break down naringenin chalcone in the peel; treating the tomato peel with a caustic solution including $OH^-$ molecules to separate the peel from the fruit; introducing pH adjusted water to the $OH^-$-treated tomato; and peeling the tomato to remove the peel from the underlying fruit.

In another embodiment of the invention, a method for removing a peel from a tomato, comprises the steps of providing a tomato having a peel and an underlying fruit; washing the tomato with a solution including a fatty acid and a surfactant to break down naringenin chalcone in the peel; treating the tomato peel with a sodium hydroxide solution to separate the peel from the fruit; introducing pH adjusted water to the $OH^-$-treated tomato; and peeling the tomato to remove the peel from the underlying fruit.

In another embodiment of the invention, a method for removing a peel from a tomato, comprises the steps of providing a tomato having a peel and an underlying fruit; assaying the tomato to determine an amount of naringenin chalcone in the peel; washing the tomato with a solution to break down the naringenin chalcone in the peel; treating the tomato peel with a caustic solution including $OH^-$ molecules to separate the peel from the fruit; introducing pH adjusted water to the $OH^-$-treated tomato; peeling the tomato to remove the peel from the underlying fruit; and providing process controllers to automate the washing, treating, introducing, and peeling steps.

Further objects and advantages of the invention will be apparent from the following description and appended claims.

DETAILED DESCRIPTION OF THE PREFERRED EMBODIMENT

The following detailed description describes various exemplary embodiments of the invention. The description serves to enable one skilled in the art to make and use the invention, and are not intended to limit the scope of the invention in any manner. In respect of the methods disclosed, the steps presented are exemplary in nature, and thus, the order of the steps is not necessary or critical.

According to an embodiment of the invention, a bulk source of tomatoes is provided. It is understood that the process parameters discussed herein may vary based on the variety of bulk tomatoes provided, as well as the maturity of the tomatoes. The bulk tomatoes are loaded by conveyor to a first vessel. The first vessel may be a modified FMC Lye Tomato Peeler. However, other modified peelers and holding tanks, such as the 40 ton per hour (tph) peeler manufactured by Imdec S.A., the 12 tph model manufactured by Rossi-Catelli, the FMC Hy-Ton, and the like, for example.

In the first vessel, the tomatoes are subjected to a washing step. The peels of the tomatoes are washed in a solution of a fatty acid and a desired surfactant. The pH of the solution is adjusted to 7.0 with a caustic solution such as sodium hydroxide, for example. The solution is adapted to clean the pores of the peel of the tomatoes, while also swelling the pores to a substantially uniform size. The surfactant aids in the cleaning of the tomatoes while solubilizing the fatty acid. The fatty acid may be an octanoic acid such as caprylic acid, and the surfactant may be an alkylglucoside such as AG 6202, AG 6206, and AG 6210 manufactured by Akzo Nobel.

During the washing step, naringenin chalcone (NG) is broken down. NG is a compound found in the outer layer of tomato peels that, when polymerized, contributes to a thicker outer layer of the tomato peel and results in harder-to-peel tomatoes. By breaking down the NG on the surface of the tomato peels during the washing step, the outer layer of the tomato peel is weakened, thereby facilitating passage of $OH^-$ molecules through the peel. Favorable results have been obtained in the first vessel by exposing the tomatoes to the solution at about 140° F. for about 60 seconds. It is understood that the temperature and time of exposure of the tomatoes may be varied based on the amount and quality of the tomatoes and tomato peels washed.

The bulk tomatoes are transported to a second vessel for an $OH^-$ molecule treatment step. In the second vessel, the washed tomatoes are subjected to a lye solution, also known as sodium hydroxide, to separate the peel from the underlying fruit of the tomatoes. Favorable results have been obtained by exposing the tomatoes to a sodium hydroxide solution having from about 3% to about 10% sodium hydroxide by weight at temperatures above about 190° F. for about 20 to about 40 seconds. Favorable results have been obtained by exposing the tomatoes to a sodium hydroxide solution having from about 5% to about 8% sodium hydroxide by weight solution at or above about 190° F. for about 30 seconds. However, higher or lower concentrations of sodium hydroxide solution may be used, as desired, and a caustic solution other than sodium hydroxide may be used. It is understood that the temperature and time of exposure of the tomatoes may be varied based on the amount and quality of the tomatoes and tomato peels washed and the desired quality of peeled tomatoes. It is also understood that the sodium hydroxide solution may also include a surfactant and sucrose, as desired. The surfactant may be an alkylglucoside, for example.

After the $OH^-$ molecule treatment step, the lye-treated tomatoes (peel and fruit) are then exposed to pH adjusted water at 100° F. for about 45 seconds. The pH of the water is at or below 7. Favorable results have been obtained from exposing the tomatoes to water having from about 0.5% to about 2.0% food grade organic acid by weight. Favorable results have also been obtained from exposing the tomatoes to water having about 1% by weight food grade organic acid. The food grade organic acid may be citric acid, lactic acid, or palmitic acid, for example. In the event that the pH adjusted water requires additional pH adjustment, hydrochloric acid may be added to the water. Favorable results have been obtained from exposing the tomatoes to water having about 1% hydrochloric acid by weight. The hydrochloric acid solution may include a buffer solution.

The tomato is then peeled to separate the peel from the underlying fruit. It is understood that the lye-treated tomatoes may be peeled with a conventional scrubber-type peeler, as desired. It is understood that the lye-treated tomatoes may also be peeled with the hot water in the second vessel or in a third vessel, as desired. The peeling process results in tomato fruit, tomato peel, and tomato residue. Typically, the tomato fruit is separated from the peel and the residue for the processing of thereof.

Because the treated tomatoes and residue contain very low concentrations of $OH^-$, the tomato peel and residue may be pH adjusted with a food grade organic acid and processed to prepare food grade products, thereby minimizing wasted tomato peel and the residue. In a preferred embodiment, the tomato peel and residue are pH adjusted with the food grade organic acid to the original pH of an unprocessed tomato. The food grade organic acid may be citric acid, lactic acid, or palmitic acid, for example. Once the tomato peels and residue are pH treated, the tomato peels and residue are further processed to prepare catsup, pizza sauce, and the like for consumption. By pH adjusting the peel and the residue and processing the same into a consumable product, valuable nutrients in the peel and residue, such as carotenoids, like lycopene and beta-carotene, are preserved.

The bulk tomatoes may be assayed prior to treatment to determine the amount of NG contained in the tomato peels so that the solutions and chemicals used in the process described herein may be optimized. It is particularly useful to optimize an amount of fatty acid and surfactant used in the washing step to breakdown the NG in the peel of the bulk tomatoes. One of ordinary skill in art would appreciate the amounts of fatty acid and surfactant required to breakdown the NG in the peel to a desired level once the tomatoes have been assayed. Furthermore, if the process is automated, the variety, maturity, NG content, field conditions where the tomatoes were grown, soil type for where the tomatoes are grown, and the particular farmer that grew the tomatoes for each bulk supply or "batch" of tomatoes may be entered into process controllers so that the appropriate residence times, residence temperatures, and amounts of chemicals the tomatoes are exposed to are minimized to optimize the time and cost of processing the tomatoes. The process controllers include computers adapted to adjust the process parameters of each step of the process using a feedback loop.

In accordance with the provisions of the patent statutes, the present invention has been described in what is considered to represent its preferred embodiment. However, it should be understood that the invention can be practiced otherwise than as specifically illustrated and described without departing from its spirit or scope.

What is claimed is:

1. A method for removing a peel from a tomato, comprising the steps of:
   providing a tomato having a peel and an underlying fruit;
   washing the tomato with a pH-neutral solution including a fatty acid and a surfactant to break down naringenin chalcone in the peel and to swell the pores of the peel to a substantially uniform size;
   treating the tomato peel with a caustic solution including $OH^-$ molecules to separate the peel from the fruit, wherein the caustic solution is separate from the pH-neutral solution;
   introducing pH adjusted water to the $OH^-$-treated tomato; and
   peeling the tomato to remove the peel from the underlying fruit.

2. The method of claim 1, wherein the fatty acid is an octanoic acid.

3. The method of claim 2, wherein the octanoic acid is caprylic acid.

4. The method of claim 1, wherein the surfactant is an alkylglucoside.

5. The method of claim 1, wherein the pH-neutral solution is at a temperature of about 160° F.

6. The method of claim 5, wherein the tomato is exposed to the pH-neutral solution for about 60 seconds.

7. The method of claim 1, wherein the caustic solution of the treating step is a sodium hydroxide solution.

8. The method of claim 7, wherein the sodium hydroxide solution contains from about 3% to about 10% sodium hydroxide by weight.

9. The method of claim 8, wherein the sodium hydroxide solution contains from about 5% to about 8% sodium hydroxide by weight.

10. The method of claim 7, wherein the tomato is treated with the sodium hydroxide solution is at a temperature of about 190° F.

11. The method of claim 10, wherein the tomato is treated with the sodium hydroxide solution for from about 20 seconds to about 40 seconds.

12. The method of claim 11, wherein the tomato is treated with the sodium hydroxide solution for about 30 seconds.

13. The method of claim 1, wherein the caustic solution further includes at least one of a surfactant and sucrose.

14. The method of claim 1, wherein the pH-adjusted water introduced to the tomato includes about 1% food grade organic acid by weight.

15. The method of claim 1, further comprising a step of treating the peel of the tomato with an organic acid to obtain a tomato peel having the substantially same pH as an unprocessed tomato.

16. The method of claim 1, further comprising a step of assaying the tomato prior to the washing step to determine an amount of naringenin chalcone in the peel.

17. The method of claim 1, further comprising a step of providing process controllers to automate the washing, treating, introducing, and peeling steps.

18. A method for removing a peel from a tomato, comprising the steps of:
providing a tomato having a peel and an underlying fruit;
washing the tomato with a pH-neutral solution including a fatty acid and a surfactant to break down naringenin chalcone in the peel and to swell the pores of the peel to a substantially uniform size;
treating the tomato peel with a sodium hydroxide solution to separate the peel from the fruit, wherein the sodium hydroxide solution is separate from the pH-neutral solution including a fatty acid;
introducing pH adjusted water to the OH⁻-treated tomato; and
peeling the tomato to remove the peel from the underlying fruit.

19. A method for removing a peel from a tomato, comprising the steps of:
providing a tomato having a peel and an underlying fruit;
assaying the tomato to determine an amount of naringenin chalcone in the peel;
washing the tomato with a pH-neutral solution to break down the naringenin chalcone in the peel and to swell the pores of the peel to a substantially uniform size;
treating the tomato peel with a caustic solution including OH⁻ molecules to separate the peel from the fruit, wherein the caustic solution is separate from the pH-adjusted solution;
introducing pH adjusted water to the OH⁻-treated tomato;
peeling the tomato to remove the peel from the underlying fruit; and
providing process controllers to automate the washing, treating, introducing, and peeling steps.

* * * * *